Sept. 3, 1957 W. BLUMENTRITT 2,804,784
VARIABLE SPEED TRANSMISSION GEARING
Filed April 6, 1955 4 Sheets-Sheet 1

INVENTOR
Werner Blumentritt
BY Pierce, Scheffler & Parker
ATTORNEYS

Sept. 3, 1957 W. BLUMENTRITT 2,804,784
VARIABLE SPEED TRANSMISSION GEARING
Filed April 6, 1955 4 Sheets-Sheet 2

INVENTOR
Werner Blumentritt
BY
Pierce, Scheffler & Parker
ATTORNEYS

Sept. 3, 1957 W. BLUMENTRITT 2,804,784
VARIABLE SPEED TRANSMISSION GEARING
Filed April 6, 1955 4 Sheets-Sheet 3

INVENTOR
Werner Blumentritt
BY Pierce, Scheffler & Parker
ATTORNEYS

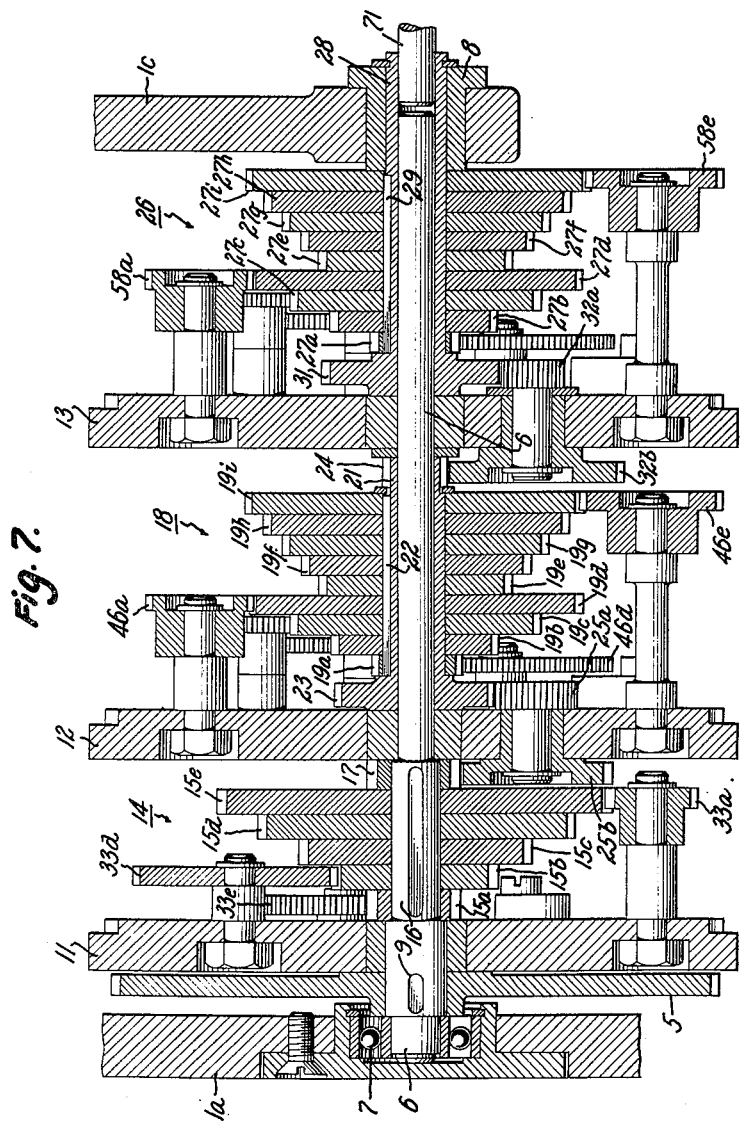

United States Patent Office 2,804,784
Patented Sept. 3, 1957

2,804,784
VARIABLE SPEED TRANSMISSION GEARING

Werner Blumentritt, Zurich, Switzerland, assignor to Micafil A.-G., Zurich, Switzerland Application April 6, 1955, Serial No. 499,653

Claims priority, application Switzerland April 12, 1954

5 Claims. (Cl. 74—681)

This invention relates to variable speed transmissions and in particular to those for use in winding machines which advance the wire guide in the case of a layer winding machine, or rotate the ring in the case of a ring winding machine as the wire is wound, the rate of the advance of the wire guide or, alternatively, the rate of rotation of the ring being wound being varied as a function of the size of the wire, i. e. the wire diameter, in order that adjacent turns of the wound-on wire will always be certain to lie close together.

Various types of variable speed transmissions have been developed for this purpose among which are stepless friction wheel gearing usually graduated for several ranges. However, due to wear and play of the individual setting mechanisms, deviations or errors, especially in the vicinity of the zero positions, are inevitable. Also used on ring winding machines are variable speed gearing sets but the ones so far developed impair visibility of the actual feed movement.

The object of the present invention is to provide an improved variable speed gearing which has all of the advantages of a stepless friction gearing in that the speed of the gearing or transmission may be varied over a rather wide range in practically an infinite number of steps but none of the disadvantages in that the gearing will remain accurate for all settings throughout its normal useful life. The objective is attained by a transmission designed in accordance with the decimal system of notation, and wherein a plurality of intermediate output speeds each corresponding to a selected digit from 0 upwards in a certain decimal place or decade such as for example the tenths, hundredths and thousandths places or decades, are combined in additive gearing to produce a final output speed representative of the selected decimal fraction which corresponds to the diameter of the wire being wound. The output speed of the gearing therefore varies in the same sense as the increase in diameter of the wire being wound and thus assures a correct rate of advance of the wire guide for each size of wire.

The foregoing as well as other objects and advantages inherent in the invention will become more apparent from the following detailed description of a preferred embodiment thereof when considered with the accompanying drawings wherein.

Figure 1:
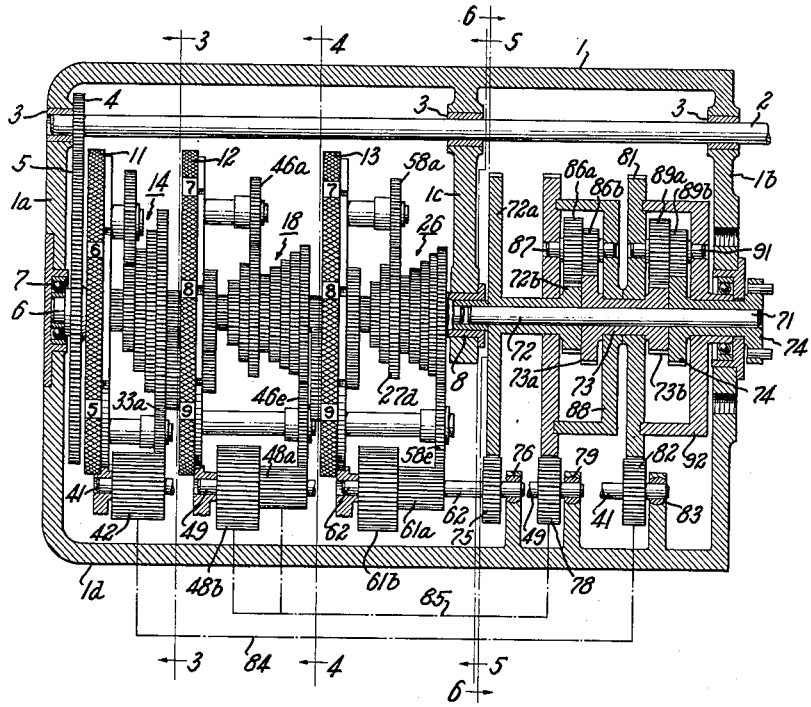
Fig. 1 is a longitudinal sectional view through the gear transmission and housing enclosing the same.

Figs. 3, 4, 5 and 6 are transverse sectional views taken on lines 3—3, 4—4, 5—5 and 6—6 respectively of Fig. 1; and Fig. 7 is a longitudinal section showing a portion of the gear transmission at a larger scale for clearer understanding of the mechanism.

With reference now to the drawings and to Figs. 1 and 7 in particular, the improved variable speed transmission is contained within a housing 1. An input shaft 2, adapted to be driven at a constant speed from any suitable source of rotary power (not shown), is journalled within the housing on a plurality of bearing sleeves 3 spaced along the shaft, two of these sleeves being in the opposite end walls 1a, 1b of the housing and a third such sleeve being located in an intermediate partially transverse wall 1c.

At the left end of input shaft 2, is a pinion gear 4 driven by it which is meshed with a larger gear 5 mounted upon a shaft 6 extending longitudinally within housing 1 and parallel with shaft 2. Shaft 6 is journalled in end wall 1a by means of an anti-friction bearing 7 and in the intermediate wall 1c by a bearing sleeve 8, and gear 5 is secured to shaft 6 by means of a spline 9. Consequently, rotation of shaft 2 at constant speed will, through gears 4 and 5, drive shaft 6 at a constant but lower speed.

Mounted along shaft 5 but not splined thereto in order to permit rotary adjustment on the shaft are three circular plates 11, 12 and 13 by which the operator can set the variable speed transmission to establish the proper output speed for any wire diameter in a range from .000 to .599 millimeter. As will become clearer as the description proceeds, plate 11 selects any digit in the tenth decade from 0 to 5, plate 12 selects any digit in the hundredth decade from 0 to 9 and plate 13 selects any digit in the thousandth decade from 0 to 9.

The variable speed gearing for each of the three decimal places or decades corresponding to the wire size is located to the right of the corresponding plate. The gearing 14 for the tenth place or decade, or more properly the lower half of the tenth decade since in the present embodiment only the lower half, i. e. from 0–5 of this decade is involved, comprises a set of five gears 15a–15e stepped in diameter and increasing linearly in a ratio of 1:1. That is, gear 15e has a diameter five times larger than that of gear 15a. These gears are mounted on shaft 6, and secured thereto by means of a spline 16. Consequently, the gear set 15a–15e rotates at the same speed as shaft 6. Also secured upon shaft 6 by this same spline is a pinion gear 17, which serves as part of the drive for the gearing 18 of the second decimal place or hundredths decade.

Gearing 18 is comprised of nine stepped gears 19a–19i mounted upon a sleeve 21 which in turn is mounted freely rotatable upon the shaft 6. The gears 19a–19i are secured to sleeve 21 by a spline 22 and moreover are divided into two groups. One group has four gears 19a–19d increasing linearly in diameter in a ratio of 1:1, and the other group has five gears 19e–19i increasing in diameter in continuation.

Sleeve 21 also includes integrally therewith at its opposite ends, on opposite sides of the gears 19a–19d, the gears 23 and 24, respectively. Gear 23 is meshed with one gear portion 25a of a two-step gear journalled for free rotation in selector plate 12, and the other gear portion 25b of this step gear is meshed with gear 17 driven by shaft 6. Gear 25b is twice the diameter of gear 17 and gear 25a is one-half the diameter of gear 23. Consequently the gear set 19a–19i will be driven at a gear reduction of 4:1, i. e. at one- fourth the speed of gear set 15a–15e. Gear 24 serves as part of the drive for the gearing 26 of the third decimal place or thousandths decade.

Gearing 26 is identical with gear set 19a–19i of the hundredths decade, being comprised of nine stepped gears 27a–27i mounted upon a sleeve 28 which, in turn, is mounted freely rotatable upon shaft 6. Gears 27a–27i are made fast upon sleeve 28 by a spline 29 and are divided into two groups. One group has four gears 27a–27d increasingly linearly in diameter in a ratio of 1:1, and the other group has five gears 27e–27i increasing in diameter in continuation.

Sleeve 28 also includes integrally therewith at its left end, at the left sides of gears 27a–27i, a gear 31 meshed with one gear portion 32a of a two-step gear journalled for free rotation in selector plate 13, and the other gear portion 32b of this step gear is meshed with gear 24 formed on sleeve 21. The transmission formed by gears 24, 32b, 32a and 31 is such as to effect a 10:1 reduction. That is, gear set 27a–27i will be driven at one-tenth the speed of gear set 19a–19i.

With the arrangement so far described the speed values of the gears 27a–27i of the thousandths decade 26 are only a tenth part of the corresponding gears 19a–19i of the hundredths decade 18 whose speed values are, in turn, a tenth part of the corresponding gears 15a–15e of the tenths half decade 14.

Associated with each set of driving gears 15a–15e, 19a–19i, and 27a–27i is a set of driven gears permanently in mesh therewith and which are mounted on the corresponding selector plates 11, 12 and 13.

Figure 3:
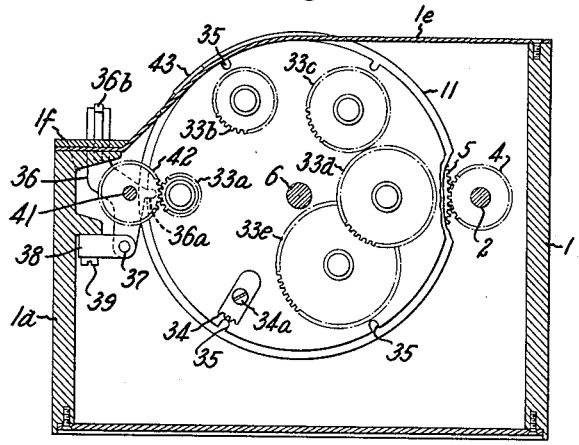

Since there are five gears 15a–15e in the tenths decade, there are thus five gears 33a–33e mounted rotatably on stub shafts at the side of selector plate 11. As best seen in Fig. 3, gears 33a–33e are graduated in diameter to match the stepped arrangement of the gears 15a–15e and are meshed with the latter in an inverse order of their diameter, i. e the smallest driven gear 33a is meshed with the largest driving gear 15e and hence gives the highest speed for the decade. In a similar manner, the largest driven gear 33e is meshed with the smallest driving gear 15a and hence gives the lowest speed for this decade.

Each of the gears 33a–33e is angularly displaced 60° from its adjacent gear as related to the center of plate 11, i. e. the axis of shaft 6, and the axes of rotation of these gears are set at distances from the axis of shaft 6 which vary inversely at their diameters so that the outermost part of each gear will lie at the same distance from the axis of shaft 6. In addition to the five gears 33a–33e, plate 11 also carries a stationary gear segment 34 secured thereto by a screw 34a. This gear sector 34 corresponds to a speed zero for the tenths decade.

Figure 2:
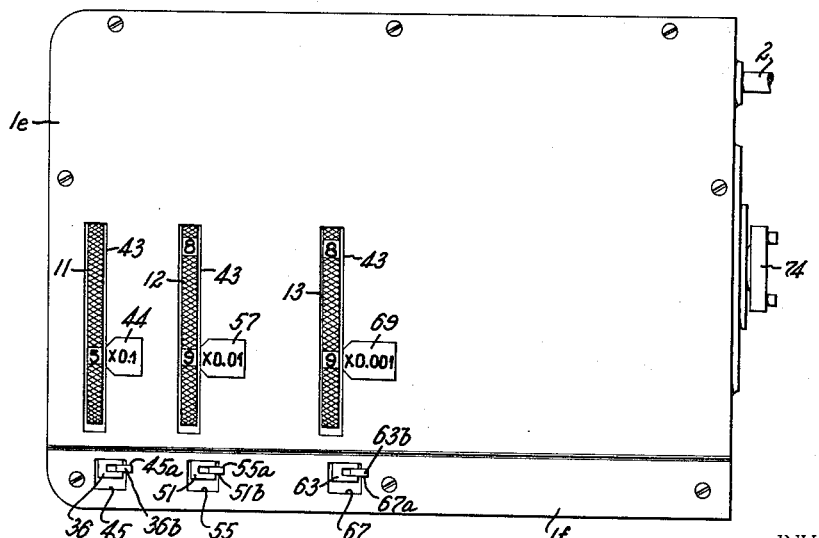
Fig. 2 is a top plan view of the exterior of the housing containing the transmission mechanism showing the graduated discs by which the gearing can be set to different speeds for different wire sizes varying from a diameter of .000 to .599 millimeter.

In radial alignment with the several radii containing the axes of rotation of the gears 33a–33e are the notches 35 in the periphery of selector plate 11 which are adapted to cooperate selectively with the nose 36a of a stop lever 36 pivotally connected at 37 at one end of a support bar 38 which is secured by a screw 39 to a laterally inward projection from the inside face of the front wall 1d of casing 1. Journalled in lever 36 is one end of a drive shaft 41 having an axially elongated gear 42 secured thereon which is adapted to be brought into mesh with a selected one of the driven gears 33a–33e, or the fixed gear segment 34, by rotation of selector plate 11. Consequently, gear 42 and hence shaft 41 will be driven at adjustable stepped speeds from zero, represented by a mesh between gear 42 and stationary gear segment 34, to a maximum speed represented by a mesh between gear 42 and the smallest driven gear 33a which is meshed with the largest driving gear 15e. Expressed in terms of wire diameter, mesh between gear 42 and stationary gear segment 34 corresponds to a value of zero in the tenths decade, a mesh between gear 42 and the largest gear 33e corresponds to a value of one in this decade, and mesh between gear 42 and gears 33d, 33c, 33b or 33a respectively, correspond to tenth decade values of two, three, four and five. In the selected position of selector plate 11 illustrated in the drawing, the mesh is between gear 42 and gear 33a which corresponds to a selected tenth decade value of five, or, decimally speaking .5. This value is indicated by the figure "5" on the periphery of selector plate 11, in radial alignment with gear 33a, shown in Fig. 2, where it will be seen that a portion of each of the selector plates 11, 12 and 13 projects through correspondingly positioned slots 43 in the top cover plate 1e of casing 1. In a similar manner, the other numerals in this decade, i. e. 0–4, are placed on the periphery of selector plate 11 at locations in radial alignment with their respectively associated gear elements 34 and 33e–33b. The peripheries of the selector plates 11—13 are preferably knurled to effect a non-slip characteristic in turning with one's finger. If desired, the cover plate 1e may be provided with a legend 44 opposite the numerals on selector plate 11 reading "X0.1" to designate this as the tenths decade, or rather half decade since the range in this decade extends only from zero to five.

The upper end of stop lever 36 projects outwardly through an opening 45 in a top plate member 1f of the casing for manipulation by hand to release and engage gear 42 and in order to maintain gear 42 in mesh with the selected gear in the set 34, 33a–33e, the upper end of stop lever 36 is provided with a lateral projection 36b which is adapted to engage a notch 45a in one of the marginal edges which define the opening 45.

Rotation of shaft 41 as driven by gear 42 and constituting an intermediate output speed corresponding to the selected digit in the tenths decimal place is transmitted to an additive gearing by which is computed the output speed of the gear transmission and which will be explained hereinafter in further detail.

Figure 4:
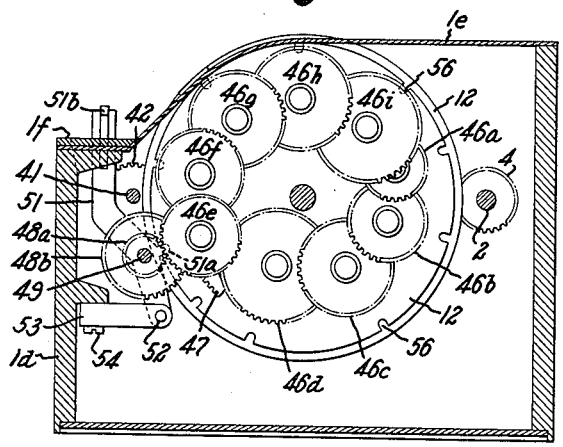

The set of gears associated with set of driving gears 19a–19i of the hundredths decade, and mounted on stub shafts at the side of selector plate 12 as best seen in Fig. 4, are divided into two sections. One section, comprising four gears 46a–46d and the stationary gear segment 47 have their axes of rotation located at such distances from the center of the plate 12 varying inversely as their diameters that all are adapted to be engaged selectively with the larger diameter section 48b of a two step gear secured upon shaft 49, one end of which is journalled in lever 51 mounted pivotally at 52 on support bar 53 secured by screw 54 to another inwardly projecting portion on the front wall 1d of casing 1. The upper end of lever 51 also projects through an opening 55 in the casing top plate member 1f and is also provided with a lateral projection 51b adapted to engage a notch 55a to latch it in a position of mesh with the gear selected to drive gear 48a or 48b.

The other gear section, comprising five gears 46e–46i, have their axes of rotation located at such distances from the center of plate 12, varying inversely at their diameters that all are adapted to be engaged selectively with the smaller diameter section 48a of the driven gear on shaft 49.

The first gear section on plate 12, i. e. gears 46a–46d are permanently meshed with gears 19d–19a, respectively and correspond to selected digital values in the hundredths decade from one to four. The second gear section on plate 12, i. e. gears 46e–46i, are permanently meshed with gears 19i–19e, respectively and correspond to selected digital values in the hundredths decade from five to nine. The digital value of zero for this decade is constituted by a mesh between gear 48b and the stationary gear segment 47.

The periphery of selector plate 12 is also provided with a series of notches 56 in radial alignment with the gears 46a–46i adapted to engage a nose 51a on the pivotal lever 51 and thereby latch selector plate 12 in the position chosen for bringing a selected one of the gears 46a–46i into mesh with gear section 48a or 48b. Moreover, the periphery of plate 12 is provided with numerals from 0 to 9 corresponding to the gear selected, and a legend 57 opposite the numeral in view reading "X0.01" is provided to designate this as the hundredths decade. In the selected position illustrated in the drawings, gear 19i is meshed with gear 46e which in turn is meshed with gear 48a thus constituting the highest output speed for the hundredths decade which corresponds to a digital value of nine in this decade. Rotation of shaft 49, as driven by gear 48a–48b, and constituting a second intermediate output speed corresponding to the selected digit in the second decimal place is likewise transmitted to an additive gearing by which is computed the final output speed of the gear transmission.

Figure 5:
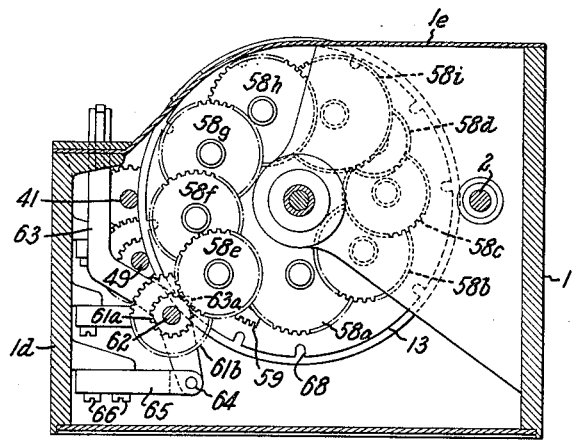
Figure 6:
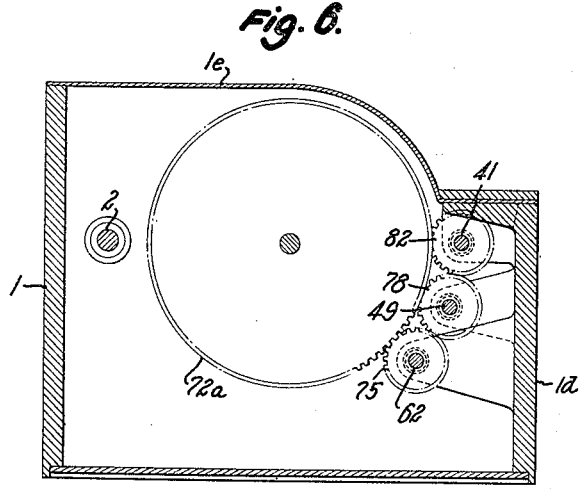

The set of driven gears associated with the set of driving gears 27a—27i of the thousandths decade and mounted on stub shafts at the side of selector plate 13, as best seen in Fig. 5, are identical in construction with the gears of the hundredths decade. Thus, one section of the gear set comprising four gears 58a–58d and the stationary gear segment 59 have their axes of rotation at such distances from the center of plate 13 varying inversely as their diameters that all are adapted to be engaged selectively with the larger diameter section 61b of a two step gear secured upon shaft 62, one end of which is journalled in lever 63 mounted pivotally at 64 on support bar 65 secured by screw 66 to another inwardly projecting portion on the front wall 1d of casing 1. The upper end of lever 63 also projects through an opening 67 in the casing top plate member 1f and is provided with a lateral projection 63b adapted to engage a notch 67a to latch it in a position meshing a selected one of the gears in the thousandth decade with gear 61a or 61b.

The other gear section, comprising five gears 58e–58i, have their axes of rotation located at such distances from the center of plate 13 varying inversely as their diameters that all are adapted to be engaged selectively with the smaller diameter selected 61a of the driven gear on shaft 62.

The first gear section on plate 13, i. e. gears 58a–58d are permanently meshed with gears 27d–27a, respectively and correspond to selected digital values in the thousandths decade from one to four. The second gear section on plate 13, i. e. gears 58e–58i, are permanently meshed with gears 27i–27e, respectively and correspond to selected digital values in the thousandths decade from five to nine. The digital value of zero for this decade is constituted by a mesh between gear 61b and the stationary gear segment 59.

The periphery of selector plate 13 is also provided with a series of notches 68 in radial alignment with the gears 58a–58i adapted to engage a nose 63a on pivoted lever 63 and thereby latch selector plate 13 in the position chosen for bringing a selected one of the gears 58a–58i into mesh with gear section 61a or 61b. Moreover, the periphery of plate 13 is provided with numerals from 0 to 9 corresponding to the gear selected, and a legend 69 opposite the numeral in view reading "X0.001" is provided to designate this as the thousandth decade. In the selected position illustrated in the drawings, gear 27i is meshed with gear 58e which in turn is meshed with gear 61a thus constituting the highest output speed for the thousandths decade which corresponds to a digital value of nine in this decade. Rotation of shaft 62, as driven by gear 61a, 61b, and constituting a third intermediate speed corresponding to the selected digit in the third decimal place is likewise transmitted to an additive gearing which will now be described.

As previously explained, the rotary motions or speeds imparted to shaft 41 from the tenths decade, to shaft 49 from the hundredths decade, and to shaft 62 from the thousandths decade are summed in additive gearing shown in Fig. 1 in the right side of housing 1. With reference now to Fig. 1, it will be seen that the additive gearing is carried on a shaft 71 mounted on bearing sleeves in the walls 1c, 1b coaxially with the shaft 6. Mounted rotatably on shaft 71 in end-to-end relation are two, two-step gears 72, 73 and a third gear 74. The larger diameter portion 72a of gear 72 is meshed with a gear 75 mounted on the opposite end of drive shaft 62 from the output of the thousandths decade. This end of shaft 62 is mounted in a spherical bearing 76 so as to enable the other end of this shaft which is journalled in the pivoted lever 63 to move whenever lever 63 is shifted about its pivotal support to engage and disengage the gearing.

Rotatably mounted on a sleeve portion of gear 72 and concentric therewith is an input gear 77 of additive gearing associated with the output drive of the hundredths decade as represented by rotation of shaft 49. Gear 77 is meshed with gear 78 secured upon the opposite end of drive shaft 49, which shaft end is also mounted in a spherical bearing 79 to permit a shift of the other end when lever 51 is moved to disengage the gearing of this decade.

Rotatably mounted on a sleeve portion of gear 73 and concentric therewith is an input gear 81 of additive gearing associated with the output drive of the tenths decade as represented by rotation of shaft 41. Gear 81 is meshed with gear 82 secured upon the opposite end of drive shaft 41, which shaft end is also mounted in a spherical bearing 83 to permit a shift of the other end when lever 36 is moved to disengage the gearing of this decade.

As a matter of structural necessity, the three output shafts 41, 49 and 62 from the three decades must be at different levels as shown in Fig. 5. Consequently, it is not possible to show the full lengths of all of these shafts in Fig. 1. Shaft 62, the lowermost one in the casing, is shown in full but the middle portions of the other two shafts 41 and 49 are omitted. These middle portions are thus represented diagrammatically in Fig. 1 by the dot-dash lines 84 and 85.

The additive gearing associated with input gear 77 includes a step gear consisting of a larger diameter gear 86a and a smaller diameter gear 86b journalled for rotation on an axis eccentric to the shaft 71. One end of the stub shaft 87 supporting gear 86a, 86b is journalled in a bearing sleeve in the body of gear 77 and the other end of shaft 87 is journalled in a bearing sleeve in a plate 88 which is secured to and rotates with gear 77 and is rotatably mounted on a sleeve portion of the step gear 73a, 73b, adjacent gear 81. Consequently, step gear 86a, 86b rotates on its own axis and is also rotatable with gear 77 about the axis of the latter. The larger diameter gear portion 86a is meshed with the smaller diameter portion 72b of gear 72 with a transmission ratio of 1:1 and the smaller diameter gear portion 86b is meshed with the larger diameter portion 73a of step gear 73 with a gear reduction transmission ratio of 1:2.

The additive gearing associated with input gear 81 includes a step gear consisting of a larger diameter gear 89a and a smaller diameter gear 89b journalled for rotation on an axis eccentric to the shaft 71. One end of the stub shaft 91 supporting gear 89a, 89b is journalled in a bearing sleeve in gear 81 and the other end of shaft 91 is journalled in a bearing sleeve in a plate 92 which is secured to and rotates with gear 81 and is rotatably mounted on a sleeve portion of the gear 74. Consequently, step gear 89a, 89b rotates on its own axis and is also rotatable with gear 81 about the axis of the latter. The larger diameter gear portion 89a is meshed with the smaller diameter gear portion 73b at a transmission ratio of 1:1, and the smaller diameter gear portion 89b is meshed with gear 74 with a gear reduction transmission ratio of 1:2.

The summation in the additive gearing is due to the fact that the motions are transmitted from the larger diameter gears 86a and 89a to the two gears 77 and 81 respectively. From the smaller diameter gears 86b and 89b are transmitted rotary motions, reduced in a ratio of 1:2 to the gears 73a and 74 in the same direction of rotation. The rotary motions produced on the gear 72a are added in the same manner.

The rotary motions of the drive shafts 49 and 62 constituting the output of selected digital values in the hundredths and thousandths are thus transmitted as summands to the additive gearing at input gears 77 and 72a respectively from where the total of the rotary motions formed is transmitted again as a summand, in a reduction of 1:2 over the gear 73a, 73b to gear 89a in the additive gearing associated with the tenths decade. In this latter gearing are added the selected digital value in the first half of the tenths decade as represented by the rotary motion of drive shaft 41 which is transmitted through gear 82 to gear 81, and the total thus formed is reduced in a ratio of 1:2. The rotary motions summed in the additive gearing related to the hundredths and thousandths digital values are thus reduced altogether in a ratio of 1:4. This is one of the reasons why the set of gears 15a–15e in the tenth decade rotates only with a four-fold speed compared to the set of gears 19a–19i in the hundredths decade, instead of a two-fold speed. The second reason is that an additional small reduction is effective during the transmission of the speeds of the gear sets 19a–19i and 27a–27i.

It is believed that the manner of operation of the device will be clear from the foregoing description and hence only a summary of the principal features will be given by way of a conclusion.

Assuming that the improved variable speed transmission in accordance with the invention is to be applied to a coil winding machine, the housing 1 will be attached to the machine (not shown) and the output gear 74 of the transmission is coupled to the mechanism controlling reciprocation of the wire-guide carriage on the machine. The input shaft 2 is coupled to a source of rotary power and driven at the proper, constant speed. The variable speed transmission can now be set to vary the rate of travel of the wire guide dependent upon the diameter of the wire so as to assure an even winding always with adjacent turns closely together. As will be appreciated, the greater the wire diameter the faster must be the feed rate of the wire guide. With the present embodiment, the feed rate can be varied in steps corresponding to a range in wire diameter from a minimum of .001 mm. to a maximum of .599 mm. there being a step change available in the gear transmission corresponding to each .001 mm. of wire diameter. In other words the present gearing has 599 different possible settings. To select any gear transmission different from that depicted in the drawings, the pivoted latching levers 36, 51 and 63 are unlatched and pulled back thus releasing their respectively associated gears 42, 48a or 48b, and 61a or 61b from the gear sets 33a–33e, 46a–46i and 58a–58i and simultaneously releasing the noses 36a, 51a and 63a on these levers from the notches 35, 56 and 68, in selector plates 11, 12 and 13 respectively. This action thus frees the selector plates 11–13 for rotary adjustment to the digital values constituting the particular size of wire to be wound. When plates 11–13 have been so adjusted, the latching levers 36, 51 and 63 are pushed to the positions shown in Fig. 2 and relatched thus locking the plates 11–13 against rotational displacement and reconnecting gears 42, 48a or 48b and 61a or 61b with the selected gears in the three gear sets 33a–33e, 46a–46i and 58a–58i. Rotation of shafts 41, 49 and 62 driven by the gears 42, 48a–48b and 61a–61b is then fed over the gears 82, 78 and 75 respectively as inputs to the additive gearing which then sums the three inputs decimally and establishes a corresponding speed for the output gear 74.

In conclusion, it is to be understood that while the foregoing illustrated embodiment is to be preferred, various changes in the construction and arrangement of parts may be made without, however, departing from the spirit and scope of the inventive concept as defined by the appended claims.

I claim:

1. A variable speed transmission gearing for winding machines arranged in accordance with the decimal system of notation, said gearing comprising a drive shaft a plurality of sets of driving gears mounted on said drive shaft, each said set of gears being driven at a constant speed and being graded in diameter to correspond to the different digits in a decimal place, said set of driving gears corresponding to the first decimal place being secured to said drive shaft for rotation therewith, said sets of driving gears corresponding to the second and third decimal places being secured upon sleeves which are mounted for rotation on said drive shaft, gearing coupling said set of driving gears corresponding to the first decimal place to said set of driving gears corresponding to the second decimal place at a drive reduction ratio of 1:4, gearing coupling said set of driving gears corresponding to the second decimal place to said set of driving gears corresponding to the third decimal place at a drive reduction ratio of 1:10, a selector plate individual to each of said sets of driving gears, said selector plates being mounted on said drive shaft coaxially with said driving gears for rotary adjustment about said drive shaft and each of said selector plates including a set of driven gears likewise graded in diameter and meshed with the corresponding set of driving gears in an inverse order of their diameter, each of said selector plates also including a stationary gear segment, an intermediate output gear and shaft driven thereby individual to each selector plate and set of driving and driven gears, each said selector plate being rotatably adjustable to different positions thereby to bring each intermediate gear into mesh with a selected one of the driven gears of the corresponding driven gear set or the corresponding stationary gear segment, and additive gearing operating with said intermediate gears and shafts, as inputs thereto for combining the same into a final output drive the speed of which is representative of the decimal fraction set up by rotary adjustment of said selector plates.

2. A variable speed transmission gearing as defined in claim 1 wherein each of said intermediate output gears and its associated shaft is carried by a pivotally mounted lever, said intermediate output gears and shafts being movable with said levers into and out of mesh with the selected driven gear of the corresponding driven gear set.

3. A variable speed transmission gearing as defined in claim 1 wherein each of said intermediate output gears and its associated shaft is carried by a pivotally mounted lever, said intermediate output gears and shafts being movable with said levers into and out of mesh with the selected driven gear of the corresponding driven gear set, and said levers each including a nose engageable with spaced notches in the periphery of the corresponding selector plate corresponding to the different driven gear selections for each decimal place.

4. A variable speed transmission gearing as defined in claim 1 wherein said additive gearing is comprised of two sets of adding gears mounted for rotation about a common mounting shaft.

5. A variable speed transmission gearing as defined in claim 4 wherein the two sets of adding gears are structurally identical.

References Cited in the file of this patent

UNITED STATES PATENTS

| 1,606,869 | Christopher | Nov. 16, 1926 |
| 1,852,282 | Biggert | Apr. 5, 1932 |
| 2,375,787 | Hazard et al. | May 15, 1945 |
| 2,521,771 | Bechle | Sept. 12, 1950 |

FOREIGN PATENTS

| 545,660 | Great Britain | June 8, 1942 |